United States Patent [19]

Jirka

[11] 3,832,483

[45] Aug. 27, 1974

[54] LINE SEQUENTIAL COLOR VIDEO ENCODING WITH EQUALLY CONTRIBUTED LUMINANCE

[75] Inventor: Howard F. Jirka, Mount Prospect, Ill.

[73] Assignee: Zenith Radio Corporation, Chicago, Ill.

[22] Filed: Dec. 27, 1972

[21] Appl. No.: 319,107

Related U.S. Application Data

[63] Continuation-in-part of Ser. No. 277,027, Aug. 1, 1972, abandoned.

[52] U.S. Cl. .......... 178/5.4 CD
[51] Int. Cl. .......... H04n 9/34
[58] Field of Search .......... 178/5.4 CD, 5.4 C, 5.4 R, 178/5.2 R

[56] References Cited

UNITED STATES PATENTS 3,522,371 7/1970 Goldmark .......... 178/5.4 R
3,749,835 7/1973 Arimura .......... 178/69.5 CB

OTHER PUBLICATIONS

W. Bruch, "Attempts for Color Video Recording on Tape with Simple Home Video Recorders", 1966, Radioschau, No. 12, pp. 654–655.

*Primary Examiner*—Howard W. Britton
*Assistant Examiner*—Michael A. Masinick
*Attorney, Agent, or Firm*—Cornelius J. O'Connor; Nicholas A. Camasto

[57] ABSTRACT

An encoding system for color television signals wherein three color-difference signals representative of the color of a scene and a luminance signal representative of the brightness of the scene are encoded as three-line sequential signals with relative amplitudes such that when the three sequential signals are matrixed in equal proportions a luminance signal is formed representative of the average luminance level of the picture over the preceding three lines.

23 Claims, 1 Drawing Figure

PATENTED AUG 27 1974 3,832,483
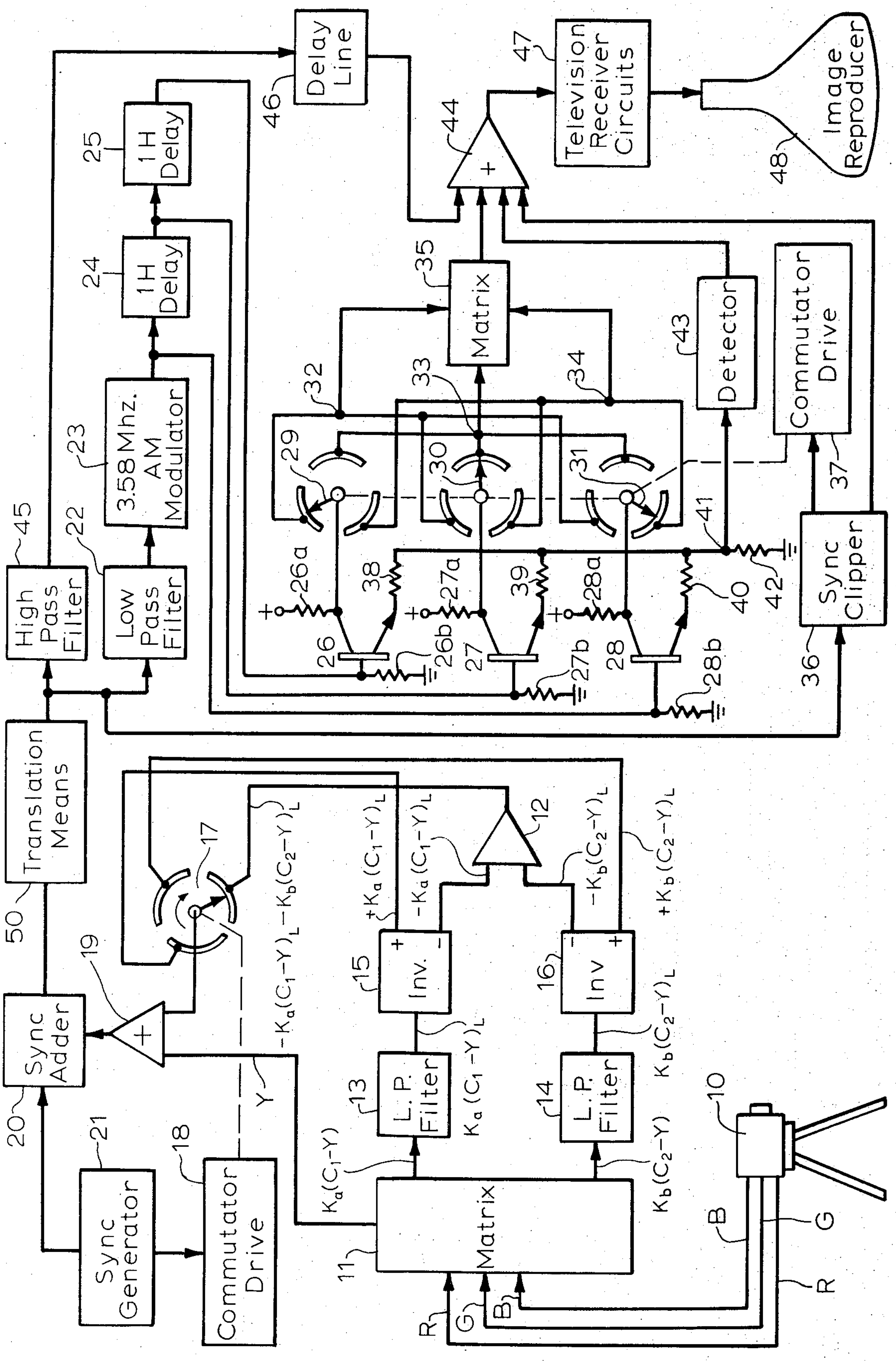

LINE SEQUENTIAL COLOR VIDEO ENCODING WITH EQUALLY CONTRIBUTED LUMINANCE

RELATED APPLICATIONS

This application is a continuation-in-part of application Ser. No. 277,027, now abandoned, filed Aug. 1, 1972, by the present applicant for "LINE SEQUENTIAL COLOR VIDEO ENCODING WITH EQUALLY CONTRIBUTED LUMINANCE," which application is assigned to the same assignee as the present application.

This application is closely related to and includes subject matter claimed in a copending application Ser. No. 336,841, filed Feb. 28, 1973 in the name of John L. Rennick and assigned to the assignee of the present invention.

BACKGROUND OF THE INVENTION

The present invention relates to video signal systems, and more particularly to an improved video recording system and method of encoding video signals.

Recently there has been a growing emphasis on video recording and reproducing systems. For any such system to achieve wide public acceptance, it must necessarily be economical, easily operable, productive of high quality images and, of course, compatible with existing television receivers. It should also ideally utilize an inexpensive storage medium, preferably something as economical as a plastic disc. This medium is particularly suitable for the consumer market because it is low in cost, readily manufacturable and of a format with which most consumers have great familiarity.

One problem with storage media is in obtaining sufficient bandwidth for faithful reproduction of color television signals. In the NTSC system, for example, the color subcarrier for chrominance information lies near the upper extreme of the luminance band, e.g., 3.58 MHz, necessitating a bandwidth of at least 4 MHz for faithful conveyance of the standard composite signals. The difficulty is that if a restricted bandwidth is encountered, high frequency information suffers and color reproduction will either be non-existent or severely degraded.

One prior art technique for overcoming this difficulty utilizes an electronic commutator for sequentially producing, in a low frequency portion of the available frequency band, signals representing every third horizontal line of the three primary colors, red (R), blue (B) and green (G). These signals are combined with a continuous high frequency luminance signal in the high frequency portion of the band. In this manner color fidelity is substantially preserved, and any degradation because of bandwidth limitations shows up in loss of picture detail. (There is, of course, a loss of vertical resolution when going from a simultaneous color system to a line sequential system. The loss may be considered acceptable, however.)

In the decoder for this system the sequential color signals are delayed in a pair of serially connected delay lines so that at any given instant all three color signals are available, representing color information from adjacent lines in the scene. A trio of commutator switches selectively route the line sequential signals to respective inputs of a matrix, wherein the signals are combined according to their contribution to the luminance signal to obtain the low frequency portion of the luminance signal.

For example, in the NTSC system the luminance signal Y of the scene is defined in terms of the relative contributions of the primary colors.

$$Y = 0.30R + 0.11B + 0.59G$$

While the luminance signal may be reconstructed by combining R, B and G in these proportions, the disproportionate contribution of the green signal causes the luminance signal to follow the level of that signal. This effectively delays response to a vertical brightness scene change to the next green line sequential signal, thereby substantially further degrading vertical resolution in the reproduced picture.

Assume that in a 525 line double-interlaced NTSC system the lines in each field are numbered consecutively and transmitted in the order R, B, G. The sequence $R_1$, $B_2$, $G_3$, $R_4$, $B_5$, $G_6$, etc., results. It follows that $Y_1$ during the first line can be expressed as $0.30R_1$; $Y_2$ during line 2 as $0.30R_1 + 0.11B_2$; $Y_3$ during the third line as $0.30R_1 + 0.11B_2 + 0.59G_3$. Similarly, $Y_4$ can be expressed as $0.30R_4 + 11B_2 + 0.59G_3$ and $Y_5$ as $0.30R_4 + 0.11B_5 + 0.59G_3$. It will be noted that $Y_3$, $Y_4$ and $Y_5$ each include $0.59G_3$ with much smaller red and blue signal contributions and, therefore, are substantially the same. In fact, because of the large contribution of green to luminance, the luminance level appears to follow green and will tend to substantially change only every third line when new information about green is received. This affects vertical resolution since abrupt luminance transitions can occur in the original scene but not receive full system recognition until the next sampling of green occurs.

One prior art system develops, instead of Y, a signal M composed of equal contributions of the R, G and B signals $$M = 0.33R + 0.33B + 0.33G$$

for overcoming this deficiency. Unfortunately, this system does not result in proper luminance levels and produces disturbingly inaccurate reproduction in many situations. It can be shown that a system using M instead of Y results in blue and magenta having high luminance and being desaturated, and green and yellow having low luminance and being supersaturated.

Accordingly, it is a general object of the present invention to provide a new method of encoding color television signals.

It is a more specific object of the present invention to provide an improved video recording system for color television signals.

It is a still more specific object of the present invention to provide a novel method of encoding color television signals for use in a narrow bandwidth channel for improving vertical picture resolution and color fidelity.

In accordance with the invention, there is provided a method and apparatus for encoding color television signals of the type comprising first, second and third color difference signals and a luminance signal representing elemental brightness variations in the scene. The method comprises cyclically combining the first, second and third color difference signals, one at a time, with the luminance signal to form first, second and third line sequential signals, respectively, the relative amplitudes of the line sequential signals being such that when algebraically added in equal proportions only the luminance signal remains. The invention further teaches decoding by applying the sequential signals to delaying means to make them simultaneously available and matrixing the signals in equal portions to derive the luminance signal for subsequent utilization.

BRIEF DESCRIPTION OF THE DRAWING

The features of the present invention which are believed to be novel are set forth with particularity in the appended claims. The invention, together with further objects and advantages thereof, may best be understood by reference to the following drawing which is a block diagram, partially in schematic form, of a color television signal encoding and decoding system constructed in accordance with the invention.

DESCRIPTION OF THE PREFERRED EMBODIMENT

Referring to the drawing, the invention is shown in block diagram form as a complete system for encoding and decoding color video signals. The link between encoding and decoding may be a transmission line, such as a telephone cable, a radio channel or a storage medium such as magnetic tape or a vinyl disc recording. At the transmitting or studio end of the system, a camera 10 generates three conventional primary color signals, R, G and B, conveying luminance and chrominance information in the televised scene. These signals are applied to a matrix circuit 11, wherein they are selectively combined to develop a luminance or Y signal conveying brightness information, and two generalized color difference signals, $K_a(C_1 - Y)$ and $K_b(C_2 - Y)$, conveying chrominance information. In these expressions $K_a$ and $K_b$ are constants and $(C_1 - Y)$, $(C_2 - Y)$ are different generalized color difference components. The color difference signals are applied to low pass filters 13 and 14, which are constructed to pass only video frequencies falling below approximately 600 KHz. These filters may comprise any one of a number of well-known multisection types with appropriate impedance elements and values to achieve the desired 600 KHz frequency characteristics.

The $K_a(C_1 - Y)_L$ and $K_b(C_2 - Y)_L$ outputs from filters 13 and 14 (the subscript L denoting a low frequency component) are applied to respective ones of two phase inverters 15 and 16 wherein the signals are inverted such that $+K_a(C_1 - Y)_L$ and $-K_a(C_1 - Y)_L$ are available at the respective outputs of inverter 15. Similarly $+K_b(C_2 - Y)_L$ and $-K_b(C_2 - Y)_L$ are available at the outputs of inverter 16.

The third low frequency color difference signal is formed in signal combiner 12 from the negatives of the $K_a(C_1 - Y)_L$ and $K_b(C_2 - Y)_L$ signals. These signals are applied to a commutator 17, which is schematically depicted as a three-segment mechanical switch with a rotating arm. In practice, this commutator comprises an electronic switch consisting of three active switch devices or their equivalents with appropriate control circuits for achieving, from an applied drive signal, the desired 120° segmented switching action.

Commutator 17 is driven by a commutator drive circuit 18, which may comprise an appropriate number of frequency divider circuits for obtaining a desired commutator switching rate from the horizontal sync pulses. In practice the commutator is driven so that it cycles at one third the horizontal scanning rate and the $K_a(C_1 - Y)_L$, $K_b(C_2 - Y)_L$ and $-K_a(C_1 - Y)_L - K_b(C_2 - Y)_L$ components are sampled every third horizontal line. The resulting line sequential signals thus are of the form $K_a(C_1 - Y)_L$, $K_b(C_2 - Y)_L$ and $-K_a(C_1 - Y)_L - K_b(C_2 - Y)_L$ for each of the 175 groups of three lines contained in the 525 line NTSC format. This signal is applied to additive video amplifier 19 wherein it is combined with the full frequency luminance signal Y developed in matrix 11. This produces line sequential signals of the general form $S_a$, $S_b$ and $S_c$, where:

$$S_a = Y + K_a(C_1 - Y)_L$$
$$S_b = Y + K_b(C_2 - Y)_L$$
$$S_c = Y - K_a(C_1 - Y)_L - K_b(C_2 - Y)_L$$

Since any generalized color difference signal may be expressed as a combination of primary color difference signals, particularly R − Y and B − Y, it also follows that, $$S_a = Y + K_1(R - Y) + K_2(B - Y)$$
$$S_b = Y + K_3(R - Y) + K_4(B - Y)$$
$$S_c = Y + K_5(R - Y) + K_6(B - Y)$$

In accordance with this invention, the line sequential signals are weighted so that $S_a + S_b + S_c = 3Y$. Moreover, the system parameters are so proportioned that $$K_1 + K_3 + K_5 = 0 \text{ and } K_2 + K_4 + K_6 = 0.$$

Thus, $$K_5 = -(K_1 + K_3),$$
$$K_6 = -(K_2 + K_4)$$

and the third line sequential signal is:

$$S_c = Y - (K_1 + K_3)(R - Y) - (K_2 + K_4)(B - Y)$$

These signals are applied to a sync adder stage 20 wherein horizontal and vertical synchronizing pulses from a conventional sync generator 21 are added to form the final video signal. The sync generator also supplies synchronization to the camera by means (not shown) and supplies horizontal sync pulses as a reference signal to commutator drive 18 to assure line-synchronized operation of that device.

Once the sync pulses have been added the signal can be translated through a narrow bandwidth channel with minimal impairment of color fidelity since chrominance information now lies below 600 KHz, instead of at 3.58 MHz as in a conventional NTSC composite video signal. The block 50, labeled TRANSLATION MEANS, may thus comprise a wire cable, a radio link, a magnetic tape, a vinyl disc or any other appropriate transmission or storage mechanism. It will be understood that a radio link will require a carrier modulator and appropriate receiver; a vinyl disc, an appropriate drive table and pickup means; etc. With tape and video discs, it may also be desirable to frequency modulate a carrier with the line sequential television signals, and record the modulated carrier on the tape or disc to reduce signal pickup problems. Equipment for frequency modulating the television signal on a carrier is not shown in the present embodiment since methods and circuitry therefor are well known.

Once the line sequential television signal has passed through translating means 50, it is processed to convert it back to a format suitable for direct application to a television receiver. While the standard receiver is assumed herein to be one compatible with an NTSC type color signal, such need not be the case since the sequential signal may be subsequently encoded for use with any specific type color receiver. The following description is, however, addressed to receivers useful with NTSC type signals.

The low frequency portions of the line sequential color signals are translated through a low pass filter 22 which, like its counterparts 13 and 14 in the encoder, allows only video signals falling below 600 KHz to pass. These low frequency signals are applied to a 3.58 MHz oscillator and AM modulator 23, wherein a locally generated 3.58 MHz carrier is amplitude modulated by the color signals in a conventional balanced modulator circuit. The resulting modulated 3.58 MHz signals are applied to a series-connected pair of high frequency delay lines 24 and 25. These delay lines each introduce a one horizontal line or 63.5 microsecond delay to the 3.58 MHz signals to make one of each of the line sequential signals simultaneously available for matrixing into the low frequency portion of an NTSC composite video signal in a manner which will be presently explained.

The undelayed output from modulator 23 is applied directly to a first chrominance amplifier 28, which preferably comprises a conventional NPN transistor having collector and emitter output circuits for providing two outputs of opposite phase. Similarly, the one-line-delayed signal from delay line 24 is applied to a second chrominance amplifier 27, and the two-line-delayed line-sequential signal from delay line 25 is applied to a third chrominance amplifier 26.

The collector of the transistor comprising chrominance amplifier 26 is connected to a source of DC biasing potential through a resistor 26*a* and its base returned to ground through a resistor 26*b*. Similarly, resistors 27*a* and 27*b* and resistors 28*a* and 28*b* provide conventional biasing connections for the collectors and bases of the transistors comprising chrominance amplifiers 27 and 28, respectively.

The inverted outputs of amplifiers 26–28 are applied to the arms of respective ones of three ganged commutator switches 29–31. To understand the operation of these switches it is necessary to first consider the functioning of delay lines 24 and 25, which have the effect of making each of the sequentially transmitted 3.58 MHz color signals simultaneously available within the receiver.

Assuming coding in the form $S_a$, $S_b$ and $S_c$, and using numerical subscripts to identify the scan line, at the beginning of line 10 $S_{10}$ will appear in the output of modulator 23, $S_9$ in the output of delay line 24 and $S_8$ in the output of delay line 25. One line later, $S_{11}$ will be in the output of modulator 23, $S_{10}$ in the output of delay line 24 and $S_9$ in the output of delay line 25. One line later, the arrangement will be $S_{12}$, $S_{11}$ and $S_{10}$, respectively. At the beginning of line 40 the sequence will be $S_{40}$, $S_{39}$, $S_{38}$; and at the beginning of line 50 it will be $S_{50}$, $S_{49}$, $S_{48}$. Thus, at any instant, three-color difference signals are available, but not at the same respective locations. Commutator switches 29–31 route the outputs of amplifiers 26–28 to appropriate ones of terminals 32–34, so that each terminal is associated with a single color difference signal. If primary color difference signals are used in the encoding process, for example, a useful sequence might be:

$$S_a = Y + K_a(R - Y)_L$$

$$S_b = Y + K_b(B - Y)_L$$

and $$S_c = Y - K_a(R - Y)_L - K_b(B - Y)_L$$

It should be understood that in a typical sequencing system $S_a$ would appear on lines 1, 4, 7, 10, etc.; $S_b$ on lines 2, 5, 8, 11, etc.; and $S_c$ on lines 3, 6, 9, 12, etc. In this situation, commutator switch 29 is phased to connect the output of amplifier 26 to terminal 32 during occurrence of green color difference signals, to terminal 33 during occurrence of red color difference signals, and to terminal 34 during occurrence of blue color difference signals. Similarly, commutator switches 30 and 31 direct the output signals from amplifiers 27 and 28 to terminals 32–34, respectively, so that color difference signals of the proper species are always present thereon.

To be effective, commutator switches 29–31 must operate in synchronism with their counterpart commutator switch 17 in the transmitter or encoder. To this end, a sync clipper circuit 36 is provided to derive horizontal and vertical synchronizing pulses from the received signal. These sync pulses are applied to a commutator driver 37 wherein they are divided down and utilized in synchronizing the switching action of the three commutator switches. Again, it must be emphasized that the commutator switches are shown as mechanical rotary switches for description purposes only; in practice conventional all-electronic switching circuitry would be used.

A system of line identification is also required to insure that commutator 29 always places the proper line sequential signals on the appropriate terminals. To this end, the sequence in the encoder and decoder is made the same, and each frame scan begins with the same generalized color difference signal. This simplification allows the vertical and horizontal sync pulse to merely control the "start" of commutator switch 29.

One useful set of sequential signals is $$S_a = Y + 30/59(R - Y)$$

$$S_b = Y + 11/59(B - Y)$$

$$S_c = Y - 30/59(R - Y) - 11/59(B - Y) = Y + (G - Y)$$

Here the G − Y signal is formed during the encoding process. However, as will be seen, when converting the signal to an NTSC subcarrier type, amplitudes must be changed and line identification is required.

When using the following encoding parameters (which are a separate invention of John L. Rennick and fully described and claimed in the copending application referred to above), it is unnecessary to have any type of line identification.

Symmetrical encoding yields:

$$S_a = Y + 0.877(R - Y)$$

$$S_b = Y - 0.438(R - Y) + 0.427(B - Y)$$

$$S_c = Y - 0.438(R - Y) - 0.427(B - Y)$$

It will be recognized that these signals are the result of demodulating an NTSC subcarrier on three axes 120° apart with equal gains (one axis corresponding to R − Y).

The non-inverted outputs of matrix amplifiers 26–28 are connected to a first matrix means comprising individual equal matrix resistors 38–40 and a common terminal 41, which is connected by a resistor 42 to ground. With line-sequential signal encoding in accordance with the invention, equal amounts of the three low-frequency color-difference signals may be combined to derive the low-frequency luminance signal. This is accomplished by resistors 38–40, and the low-frequency luminance signal $Y_L$ is developed across resistor 42.

The low-frequency luminance signal developed on a 3.58 MHz carrier across common emitter resistor 42 is subtracted from the inverted signals developed in the collector output circuits of transistors 26–28. This has the effect of eliminating the $Y_L$ components therefrom so that just the color-difference portions of the signals (amplitude-modulated on a 3.58 MHz carrier) are applied to commutator switches 29–31 and appear at terminals 32–34. These signals are applied to matrix means 35 wherein they are appropriately combined with predetermined relative phases and amplitudes to produce a standard NTSC chrominance signal of the format $0.877(R - Y)\cos Wt + 0.493(B - Y)\sin Wt$. With the line sequential signals encoded in accordance with the preferred embodiment, it will be appreciated that matrix 35 need include only appropriate phase shifting circuits for two of the color-difference signals and no level changing arrangements.

The $Y_L$ signal consists of an amplitude-modulated 3.58 MHz carrier, and must be demodulated by a detector 43, which may be a conventional envelope detector or its equivalent, prior to recombination with the primary color-difference signals in matrix amplifier 44.

The high frequency luminance signal component $Y_H$ which was transmitted non-sequentially, i.e., unswitched, is recovered with a high-pass filter 45, passed through a delay line 46 and applied to an input of matrix amplifier 44. The high-pass filter prevents the low-frequency line-sequential signals from being coupled through this path, which would negate the recombination accomplished by commutator switches 29–31, matrix means 35 and matrix amplifier 44. Delay line 46 compensates for the slightly increased propagation time of signals through the narrower bandwidth channel including low-pass filter 22 and delay lines 24 and 25. Horizontal and vertical synchronizing pulses are also added in matrix amplifier 44. Appropriate clamping and DC restoration circuits may be incorporated at this point to condition the signal for optimum reproduction.

The output of matrix amplifier 44 is an NTSC composite video signal and is applied to television receiver circuits 47, which may be those in any conventional television receiver. Therein the composite signal is amplified and demodulated to obtain suitable video signals for driving an image reproducer 48. While a video frequency signal is shown as being applied to receiver 47, in appropriate situations the output of matrix amplifier 44 may be used to modulate an RF signal which could then be directly applied to the antenna input terminals of the receiver as a regular airborne broadcast signal.

Thus, an encoding method and apparatus system which provides color television signals in a narrow bandwidth channel with minimal degradation of picture resolution and color fidelity is disclosed. The system incorporates line sequential signals which permit the luminance signal to be derived from equal contributions thereof. Furthermore, it will be appreciated that while the invention has been shown in conjunction with an NTSC signal format, it may also be used with other systems such as PAL and SECAM by appropriately modifying the circuitry and system component configuration.

While particular embodiments of the invention have been shown and described, it will be obvious to those skilled in the art that changes and modifications may be made thereto without departing from the invention in its broader aspects and, therefore, the aim in the appended claims is to cover all such changes and modifications as fall within the true spirit and scope of the invention.

What is claimed is:

1. A translation system comprising: a source of encoded color television signal, said signal comprising a luminance component representative of the brightness of a scene, a plurality of generalized color difference components representative of the chromaticity of the scene and a reference component, said color television signal being encoded in three line sequential signals of the form $Y + K_a(C_1 - Y)$, $Y + K_b(C_2 - Y)$ and $Y - K_a(C_1 - Y) - K_b(C_2 - Y)$ so that the average of said sequential signals yields said luminance component, and where $K_a$ and $K_b$ are constants; and, conversion means, including a first matrix means for combining equal portions of said line sequential signals to derive said luminance component, said conversion means being coupled to said source and operable under control of said reference component for converting said line sequential encoded signals into a composite color signal of a type suitable for application to a color television receiver.

2. A translation system as set forth in claim 1 wherein $K_a(C_1 - Y) = K_1(R - Y)$, $K_b(C_2 - Y) = K_4(B - Y)$ and $K_1$ and $K_4$ are constants.

3. A translation system as set forth in claim 2 wherein $K_1 = 30/59$ and $K_4 = 11/59$.

4. A translation system as set forth in claim 1 wherein said conversion means comprise: oscillation means and delay line means for making said sequential signals simultaneously available in modulated form.

5. A translation system as set forth in claim 4 wherein said oscillation means has a frequency equal to the color subcarrier required by said television receiver.

6. A translation system as set forth in claim 5 further including a second matrix means and a switch means for selecting the simultaneously available modulation signals for application to said second matrix means under control of said reference component.

7. A translation system as set forth in claim 6 wherein said luminance component is derived from said switch means in modulated form and further including a detector for demodulating said luminance component; and circuit means combining the outputs of said detector and of said second matrix means.

8. A translation system as set forth in claim 6 in which said luminance component in said source includes a continuous high frequency portion, and which further comprises means for confining said generalized color difference components to the lower portion of the total bandwidth.

9. A translation system as set forth in claim 8 wherein said conversion means includes a high pass filter coupled to said circuit means for bypassing said high frequency luminance portion around said switch means.

10. The method of encoding a color television signal comprising the steps of:

A. deriving a plurality of primary color signals each representative of a different color characteristic of a scene;
B. deriving a luminance signal;
C. deriving a plurality of generalized color difference components from said primary color signals; and
D. encoding said luminance signal and said components into three sequential signals each consisting of the sum of said luminance signal and a color difference component such that the algebraic addition of equal parts of said three sequential signals yields said luminance signal.

11. The method as set forth in claim 10 wherein steps B and C includes matrixing said primary color signals to derive said luminance signal and a pair of color difference components.

12. The method as set forth in claim 11 which further includes the step of confining said color difference components to the lower frequency portion of the luminance signal bandwidth.

13. The method as set forth in claim 12 which further includes the step of confining said luminance signal bandwidth to less than 4MHz and confining said lower frequency portion to less than approximately 600KHz.

14. The method as set forth in claim 11 wherein said pair of color difference components are primary color difference signals.

15. The method as set forth in claim 14 further including the step of weighting said pair of primary color difference components and combining the weighted pair to produce a third color difference component.

16. The method as set forth in claim 15 wherein said three sequential signals are formed by switching said color difference components and adding said luminance signal.

17. The method as set forth in claim 16 wherein said primary color difference components are R − Y and B − Y.

18. The method as set forth in claim 17 wherein said sequential signals are:

$$S_a = Y + 30/59(R - Y)$$

$$S_b = Y + 11/59(B - Y)$$

$$S_c = Y - 30/59(R - Y) - 11/59(B - Y).$$

19. A system for encoding and decoding color television signals in the form of color difference components primarily representative of the chromaticity of a scene, and a luminance component representative of the brightness of the scene, said system comprising: means for cyclically combining said color difference components with said luminance component to form line sequentially encoded signals, which when algebraically added in equal proportions yields said luminance component; signal translation means; means for applying said line sequentially encoded signals to said signal translation means; signal delaying means coupled to said translation means for rendering said line sequential signals simultaneously available; and first matrixing means combining equal portions of said simultaneously available line sequential signals to derive said luminance.

20. A system as described in claim 19, which further comprises second matrixing means for combining said color difference components to develop a chrominance component, and third matrixing means combining said chrominance component with said luminance component to develop a composite color television signal.

21. A system as described in claim 20 further including means for generating a carrier signal; a modulator for impressing said line sequential signals on said carrier; said signal delaying means comprising a pair of serially connected delay lines for delaying the resulting modulated signals; and said first matrixing means including a detector for deriving said luminance component from said line sequential signal modulated carrier signals.

22. The system of claim 20 wherein the frequency band of said luminance component is substantially larger than the frequency band of said color difference components.

23. The system as described in claim 22 wherein said luminance component derived by said first matrixing means comprises only frequencies below a predetermined cut-off frequency; and high pass filter means coupled to said translation means for coupling only the luminance component frequencies above said cut-off frequency to said third matrix means.

* * * * *